(12) United States Patent
Dhuria et al.

(10) Patent No.: US 11,188,696 B1
(45) Date of Patent: Nov. 30, 2021

(54) METHOD, SYSTEM, AND PRODUCT FOR DEFERRED MERGE BASED METHOD FOR GRAPH BASED ANALYSIS PESSIMISM REDUCTION

(71) Applicant: Cadence Design Systems, Inc., San Jose, CA (US)

(72) Inventors: Amit Dhuria, Fremont, CA (US); Sri Harsha Venkata Pothukuchi, San Jose, CA (US); Pradeep Yadav, Uttar Pradesh (IN); Pawan Kulshreshtha, San Jose, CA (US); Igor Keller, Pleasanton, CA (US); Sharad Mehrotra, Cedar Park, TX (US); Jean Pierre Hiol, San Jose, CA (US); Krishna Prasad Belkhale, Saratoga, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 239 days.

(21) Appl. No.: 16/384,815

(22) Filed: Apr. 15, 2019

(51) Int. Cl.
*G06F 30/30* (2020.01)
*G06F 30/3312* (2020.01)
*G06F 16/901* (2019.01)
*G06F 17/18* (2006.01)

(52) U.S. Cl.
CPC ...... *G06F 30/3312* (2020.01); *G06F 16/9024* (2019.01); *G06F 17/18* (2013.01)

(58) Field of Classification Search
CPC ... G06F 30/3312; G06F 16/9024; G06F 17/18
USPC ........................................................ 716/113
See application file for complete search history.

(56) References Cited

U.S. PATENT DOCUMENTS

| | | |
|---|---|---|
| 4,950,987 A | 8/1990 | Yadav et al. |
| 5,499,360 A | 3/1996 | Mehrotra et al. |
| 5,510,740 A | 4/1996 | Mehrotra et al. |
| 5,636,372 A | 6/1997 | Belkhale et al. |
| 5,694,568 A | 12/1997 | Mehrotra et al. |
| 5,822,790 A | 10/1998 | Mehrotra et al. |
| 5,831,870 A | 11/1998 | Mehrotra et al. |
| 5,838,582 A | 11/1998 | Mehrotra et al. |
| 5,930,819 A | 7/1999 | Mehrotra et al. |
| 5,991,524 A | 11/1999 | Belkhale et al. |
| 6,023,566 A | 2/2000 | Belkhale et al. |
| 6,061,508 A | 5/2000 | Mehrotra et al. |
| 6,081,873 A | 6/2000 | Mehrotra et al. |
| 6,086,238 A | 7/2000 | Mehrotra et al. |
| 6,145,054 A | 11/2000 | Mehrotra et al. |
| 6,148,371 A | 11/2000 | Mehrotra et al. |
| 6,148,372 A | 11/2000 | Mehrotra et al. |
| 6,154,812 A | 11/2000 | Mehrotra et al. |

(Continued)

*Primary Examiner* — Jack Chiang
*Assistant Examiner* — Brandon Bowers
(74) *Attorney, Agent, or Firm* — Vista IP Law Group, LLP

(57) ABSTRACT

An approach is described for a method, system, and product for deferred merge based method for graph based analysis to reduce pessimism. According to some embodiments, the approach includes receiving design data, static and/or statistical timing analysis data, identifying cells and interconnects for performing graph based worst case timing analysis where merger of signals is deferred based on one or more conditions to reduce pessimism, and generating results thereof. Other additional objects, features, and advantages of the invention are described in the detailed description, figures, and claims.

20 Claims, 18 Drawing Sheets

(56) References Cited

U.S. PATENT DOCUMENTS

| | | |
|---|---|---|
| 6,226,713 B1 | 5/2001 | Mehrotra et al. |
| 6,401,231 B1 | 6/2002 | Belkhale et al. |
| 6,415,422 B1 | 7/2002 | Mehrotra et al. |
| 6,430,654 B1 | 8/2002 | Mehrotra et al. |
| 6,467,069 B2 | 10/2002 | Mehrotra et al. |
| 6,510,540 B1 | 1/2003 | Mehrotra et al. |
| 6,523,149 B1 | 2/2003 | Mehrotra et al. |
| 6,532,574 B1 | 3/2003 | Mehrotra et al. |
| 6,543,037 B1 | 4/2003 | Belkhale et al. |
| 6,601,222 B1 | 7/2003 | Mehrotra et al. |
| 6,615,395 B1 | 9/2003 | Mehrotra et al. |
| 6,672,776 B1 | 1/2004 | Belkhale et al. |
| 6,694,502 B2 | 2/2004 | Mehrotra et al. |
| 6,735,754 B2 | 5/2004 | Mehrotra et al. |
| 6,928,630 B2 | 8/2005 | Belkhale et al. |
| 7,069,372 B1 | 6/2006 | Mehrotra et al. |
| 7,107,556 B1 | 9/2006 | Belkhale et al. |
| 7,168,053 B1 | 1/2007 | Belkhale et al. |
| 7,356,451 B2 * | 4/2008 | Moon ............... G06F 30/3312 703/19 |
| 7,359,843 B1 | 4/2008 | Keller et al. |
| 7,382,787 B1 | 6/2008 | Mehrotra et al. |
| 7,418,536 B2 | 8/2008 | Mehrotra et al. |
| 7,464,349 B1 | 12/2008 | Keller et al. |
| 7,478,081 B2 | 1/2009 | Mehrotra et al. |
| 7,500,111 B2 | 3/2009 | Mehrotra et al. |
| 7,561,571 B1 | 7/2009 | Mehrotra et al. |
| 7,562,323 B1 | 7/2009 | Keller et al. |
| 7,664,110 B1 | 2/2010 | Mehrotra et al. |
| 7,685,437 B2 | 3/2010 | Mehrotra et al. |
| 7,647,220 B2 | 6/2010 | Kulshreshtha et al. |
| 7,757,033 B1 | 7/2010 | Mehrotra et al. |
| 7,761,826 B1 | 7/2010 | Keller et al. |
| 7,783,900 B2 | 8/2010 | Mehrotra et al. |
| 7,797,649 B1 | 9/2010 | Belkhale et al. |
| 7,860,097 B1 | 12/2010 | Mehrotra et al. |
| 7,873,693 B1 | 1/2011 | Mehrotra et al. |
| 7,882,471 B1 | 2/2011 | Keller et al. |
| 7,940,302 B2 | 5/2011 | Mehrotra et al. |
| 7,983,891 B1 | 7/2011 | Keller et al. |
| 8,001,128 B2 | 8/2011 | Mehrotra et al. |
| 8,104,006 B2 | 1/2012 | Keller et al. |
| 8,145,824 B1 | 3/2012 | Mehrotra et al. |
| 8,245,165 B1 | 8/2012 | Keller et al. |
| 8,270,401 B1 | 9/2012 | Mehrotra et al. |
| 8,302,046 B1 | 10/2012 | Keller et al. |
| 8,341,572 B1 | 12/2012 | Keller et al. |
| 8,375,343 B1 | 2/2013 | Keller et al. |
| 8,458,390 B2 | 6/2013 | Mehrotra et al. |
| 8,516,420 B1 | 8/2013 | Keller et al. |
| 8,533,644 B1 | 9/2013 | Keller et al. |
| 8,543,954 B1 | 9/2013 | Keller et al. |
| 8,595,669 B1 | 11/2013 | Keller et al. |
| 8,601,053 B2 | 12/2013 | Mehrotra et al. |
| 8,601,420 B1 | 12/2013 | Keller et al. |
| 8,615,725 B1 | 12/2013 | Keller et al. |
| 8,631,369 B1 | 1/2014 | Keller et al. |
| 8,713,295 B2 | 4/2014 | Mehrotra et al. |
| 8,782,583 B1 | 4/2014 | Keller et al. |
| 8,726,211 B2 | 5/2014 | Keller et al. |
| 8,745,561 B1 | 6/2014 | Kulshreshtha et al. |
| 8,788,995 B1 | 7/2014 | Dhuria et al. |
| 8,863,052 B1 | 10/2014 | Dhuria et al. |
| 8,868,790 B2 | 10/2014 | Mehrotra et al. |
| 8,924,905 B1 | 12/2014 | Keller et al. |
| 8,938,703 B1 | 1/2015 | Keller et al. |
| 8,966,421 B1 | 2/2015 | Keller et al. |
| 9,003,342 B1 | 4/2015 | Keller et al. |
| 9,094,237 B2 | 7/2015 | Mehrotra et al. |
| 9,129,078 B1 | 9/2015 | Keller et al. |
| 9,286,225 B2 | 3/2016 | Mehrotra et al. |
| 9,304,902 B2 | 4/2016 | Mehrotra et al. |
| 9,384,310 B1 | 7/2016 | Keller et al. |
| 9,405,882 B1 | 8/2016 | Dhuria et al. |
| 9,509,604 B1 | 11/2016 | Mehrotra et al. |
| 9,529,962 B1 | 12/2016 | Dhuria et al. |
| 9,582,626 B1 | 2/2017 | Keller et al. |
| 9,608,936 B1 | 3/2017 | Mehrotra et al. |
| 9,672,180 B1 | 6/2017 | Mehrotra et al. |
| 9,710,593 B1 | 7/2017 | Keller et al. |
| 9,870,154 B2 | 1/2018 | Mehrotra et al. |
| 9,875,333 B1 * | 1/2018 | Verma ............... G06F 30/3312 |
| 9,881,123 B1 | 1/2018 | Keller et al. |
| 9,928,324 B1 | 3/2018 | Keller et al. |
| 9,940,241 B1 | 4/2018 | Mehrotra et al. |
| 9,973,424 B1 | 5/2018 | Mehrotra et al. |
| 10,037,394 B1 | 7/2018 | Dhuria et al. |
| 10,073,934 B1 | 9/2018 | Keller et al. |
| 10,133,842 B1 | 11/2018 | Dhuria et al. |
| 10,169,501 B1 | 1/2019 | Dhuria et al. |
| 10,185,795 B1 | 1/2019 | Keller et al. |
| 10,192,012 B1 | 1/2019 | Keller et al. |
| 10,275,554 B1 | 4/2019 | Keller et al. |
| 10,289,774 B1 | 5/2019 | Yadav et al. |
| 10,313,236 B1 | 6/2019 | Mehrotra et al. |
| 10,328,012 B2 | 6/2019 | Yadav et al. |
| 10,430,536 B1 | 10/2019 | Keller et al. |
| 10,460,059 B1 | 10/2019 | Kulshreshtha et al. |
| 10,467,365 B1 | 11/2019 | Kulshreshtha et al. |
| 10,776,547 B1 * | 9/2020 | Gupta ............... G06F 16/9024 |
| 10,789,406 B1 | 9/2020 | Keller et al. |
| 10,956,832 B2 | 3/2021 | Mehrotra et al. |
| 10,963,610 B1 | 3/2021 | Keller et al. |
| 10,990,733 B1 | 4/2021 | Dhuria et al. |
| 11,003,821 B1 | 5/2021 | Dhuria et al. |
| 11,023,636 B1 | 6/2021 | Keller et al. |
| 11,023,640 B1 | 6/2021 | Keller et al. |
| 2002/0078425 A1 | 6/2002 | Mehrotra et al. |
| 2003/0088843 A1 | 5/2003 | Mehrotra et al. |
| 2003/0115035 A1 | 6/2003 | Kulshreshtha et al. |
| 2003/0120474 A1 | 6/2003 | Belkhale et al. |
| 2003/0121013 A1 | 6/2003 | Belkhale et al. |
| 2003/0229876 A1 | 12/2003 | Mehrotra et al. |
| 2004/0243799 A1 | 12/2004 | Mehrotra et al. |
| 2004/0243816 A1 | 12/2004 | Mehrotra et al. |
| 2006/0064384 A1 | 3/2006 | Mehrotra et al. |
| 2006/0101000 A1 | 5/2006 | Mehrotra et al. |
| 2006/0117126 A1 | 6/2006 | Mehrotra et al. |
| 2006/0281221 A1 | 12/2006 | Mehrotra et al. |
| 2007/0028201 A1 | 2/2007 | Mehrotra et al. |
| 2008/0059935 A1 | 3/2008 | Mehrotra et al. |
| 2008/0059936 A1 | 3/2008 | Mehrotra et al. |
| 2008/0066044 A1 | 3/2008 | Mehrotra et al. |
| 2008/0072201 A1 | 3/2008 | Mehrotra et al. |
| 2008/0184187 A1 | 7/2008 | Mehrotra et al. |
| 2008/0254074 A1 | 10/2008 | Yadav et al. |
| 2008/0263496 A1 | 10/2008 | Mehrotra et al. |
| 2008/0263497 A1 | 10/2008 | Mehrotra et al. |
| 2008/0263498 A1 | 10/2008 | Mehrotra et al. |
| 2009/0063404 A1 | 3/2009 | Mehrotra et al. |
| 2009/0070726 A1 | 3/2009 | Mehrotra et al. |
| 2009/0077378 A1 | 3/2009 | Mehrotra et al. |
| 2009/0130042 A1 | 5/2009 | Yadav et al. |
| 2009/0199140 A1 | 8/2009 | Keller et al. |
| 2009/0254875 A1 | 10/2009 | Mehrotra et al. |
| 2013/0103880 A1 | 4/2013 | Mehrotra et al. |
| 2013/0107872 A1 | 4/2013 | Mehrotra et al. |
| 2013/0111095 A1 | 5/2013 | Mehrotra et al. |
| 2013/0117766 A1 | 5/2013 | Mehrotra et al. |
| 2014/0096099 A1 | 4/2014 | Keller et al. |
| 2014/0281140 A1 | 9/2014 | Mehrotra et al. |
| 2014/0281153 A1 | 9/2014 | Mehrotra et al. |
| 2014/0281169 A1 | 9/2014 | Mehrotra et al. |
| 2016/0132242 A1 | 5/2016 | Mehrotra et al. |
| 2016/0256368 A1 | 9/2016 | Yadav et al. |
| 2016/0256369 A1 | 9/2016 | Yadav et al. |
| 2017/0143607 A1 | 5/2017 | Yadav et al. |
| 2017/0181963 A1 | 6/2017 | Yadav et al. |
| 2019/0392354 A1 | 12/2019 | Mehrotra et al. |

* cited by examiner

Annotated
Illustration
510a

Annotated Illustration 510b

Identifiers 520b

Ph1 (Tag: Input1:1): Arr: 6, R:

Ph1 (Tag: Input2:1): Arr: 6, R:

Conditions For Merger Met ➡

Identifier 540

Ph1: Arr: 6, R:

Annotated
Illustration
610a

Annotated Illustration 610b

Identifiers 620b

| Ph1 (Tag: Input1:1): Arr: 6, R: |
| Ph1 (Tag: Input2:1): Arr: 4, R: |

Conditions For Merger Not Met

Annotated Illustration 610c

Identifiers 620c

| Ph1 (Tag: Input1:2): Arr: 7, R: |
| Ph1 (Tag: Input2:2): Arr: 6, R: |

Conditions For
Merger Not Met

Annotated
Illustration
610c

Identifiers
620d

Ph1 (Tag: Input1:3): Arr: 8, R:

Ph1 (Tag: Input2:3): Arr: 7, R:

Conditions For
Merger Met

Identifier
640

Ph1: Arr: 8, R:

Annotated
Illustration
710a

Annotated Illustration 710b

Identifiers 720b

| Ph1 (Tag: Input1:1): Arr: 6, R: |
| Ph1 (Tag: Input2:1): Arr: 3, R: |

Conditions For
Merger Not Met

Annotated Illustration 710c

Identifiers 720c

| Ph1 (Tag: Input1:2): Arr: 7, R: |
| Ph1 (Tag: Input2:2): Arr: 5, R: |

Conditions For
Merger Not Met

Annotated Illustration 710d

Identifiers 720d

| Ph1 (Tag: Input1:3): Arr: 8, R: |
| Ph1 (Tag: Input2:3): Arr: 7, R: |

Conditions For
Merger Not Met

Annotated Illustration 710e

Identifiers 720e

| Ph1 (Tag: Input1:4): Arr: 9, R: |
| Ph1 (Tag: Input2:4): Arr: 8, R: |

Conditions For
Merger Not Met

Annotated Illustration 710f

Identifiers 720f

Ph1 (Tag: Input1:4): Arr: 10, R:

Ph1 (Tag: Input2:4): Arr: 9, R:

Conditions For Merger Met ➡ Identifier 740

Ph1: Arr: 10, R:

Annotated Illustration 710f

Identifier 740

Ph1: Arr: 10, R: 12

METHOD, SYSTEM, AND PRODUCT FOR DEFERRED MERGE BASED METHOD FOR GRAPH BASED ANALYSIS PESSIMISM REDUCTION

BACKGROUND

Computer aided design (CAD) tools are often used for creating and validating electronic designs such as systems, chips, and other logical representations of items to be created under certain rules or conditions. An electronic design automation (EDA) system is one type of CAD tool for creating electronic designs.

EDA tools are often used for performing design rule compliance verification, and/or correction of design rule violations such as rules (e.g. conditions) corresponding to timing analysis, and may further include, enforcement of performance parameters. Generally, modern electronic devices are required to be made using these EDA tools. This is necessitated in part by the infrastructure that is used in the manufacture of these devices and in part because of the size of the elements that make up these devices, e.g. nanometer level features.

However, as these circuits have become more complex, timing analysis has played a larger and larger role in determining how well chips should perform. Unfortunately, current techniques sacrifice accuracy for ease of implementation of processes for analysis of worst case behavior. In particular, the prior techniques select the worst performing signals at each cell of an output. This generates data is overly pessimistic under certain conditions to the point of providing results that may not correspond to real world results that would ever occur or even be possible. These overly pessimistic result may also have a knock-on effect in circuit/chip design because circuits/chips may be redesigned in ways that consume more semiconductor resources (e.g. area, power, thermal budget, etc.) in order to meet timing targets or processing frequency parameters.

Therefore, what is needed is an improved approach for generating worst case behavior information that reduces the amount of pessimism to a level closer to actual real world results.

SUMMARY

Embodiments of the present invention provide a method, system, and product for deferred merge based method for graph based analysis pessimism reduction.

According to some embodiments, the approach includes receiving design data, static and/or statistical timing analysis data, identifying cells and interconnects for performing graph based worst case timing analysis where merger of signals is deferred based on one or more conditions to reduce pessimism, and generating results thereof. Other additional objects, features, and advantages of the invention are described in the detailed description, figures, and claims.

Other additional objects, features, and advantages of the invention are described in the detailed description, figures, and claims.

BRIEF DESCRIPTION OF FIGURES

In order that the present invention is better understood, some embodiments of the invention will now be described, by way of example only, with reference to the accompanying drawings.

DETAILED DESCRIPTION

Embodiments of the present invention provide a system, method, and product for implementing an improved approach for pessimism reduction in worst case graph based analysis using a deferred merge based method.

Figure 1:
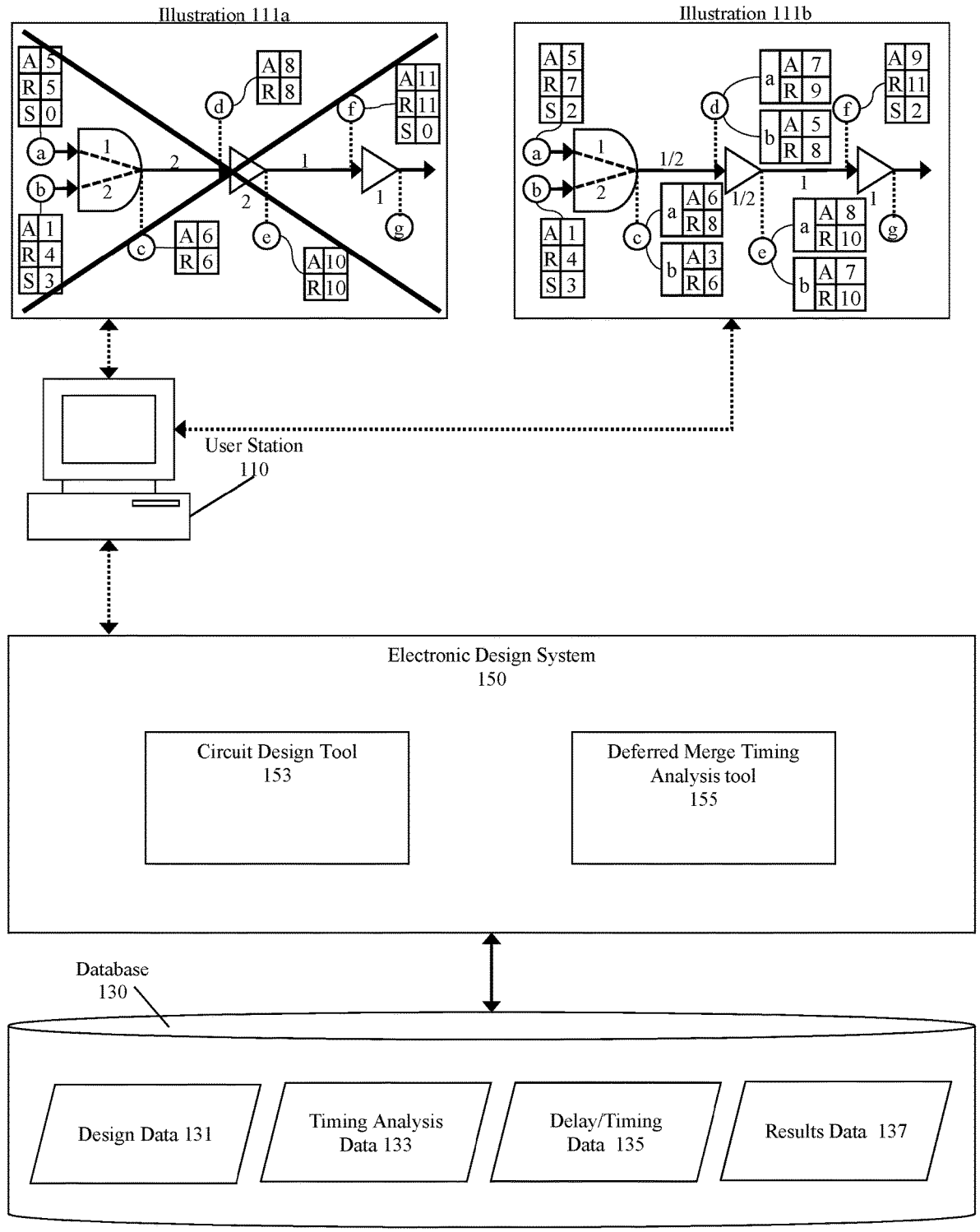
FIG. 1 depicts an example system for a deferred merge approach to graph based analysis according to some embodiments.

FIG. 1 depicts an example system for a deferred merge approach to graph based analysis according to some embodiments. In general, the approach includes identifying cells that have multiple inputs and continuing to propagate the multiple inputs for up to a number of stages (e.g. across cells or interconnects) when some set of conditions are met or continue to be met.

This type of worst case timing analysis generally corresponds to analyzing paths to determine whether those paths will meet timing requirements. For example, a particular path may logically start where another path logically ends—e.g. a path starting at a clocked latch or flip-flop circuit and ending at another clocked latch or flip-flop. Furthermore, each path can be represented by one or more arcs, either net arcs, cell arcs, or a combination thereof. Each arc can be represented by an expected arrival time at its input and/or an expected arrival time at its output, which can be computed at each net arc and cell arc of a path, e.g. by using the timing characteristics of the input to the net arc or cell arc and the delay characteristics of the net arc or cell arc. At the end of the path (e.g. at the gated element) a difference between the arrival of the clock signal and the path's signal can be determined. This difference corresponds to slack, where a slack is positive if the corresponding signal arrives before the clock signal, or negative if the signal arrives after the clock signal. If the slack is negative or below a minimum threshold the path is commonly considered to be critical, and the more critical paths you have the more likely it will be that if manufactured that chip will not operate as reliably or as long as required, if it even operates at all. Additionally, slack is used to determine if the signals will meet current timing requirements, a negative slack means that current timing requirements will probably not be met my at least some devices. Additionally, using the determined slack and the arrival times of earlier stages, required arrival times can be determined associated with each of the previously computed arrival times on a path.

Illustration 111a provides a representative illustration of a prior art technique for performing pessimistic graph based analysis. Pessimistic graph based analysis is a process to determine the available slack (if any) for a portion of a circuit (e.g. from one flip flop to another flip flop or from one cell to another cell) under worst case scenarios. The illustration, 111a, illustrates the prior art technique for performing pessimistic timing analysis using a graph. There, when multiple inputs are coupled to a cell the worst case arrival time out of all the inputs to the output of that cell (e.g. arcs) is selected immediately at the end of each arc. Furthermore, for each interconnect proceeding each cell, the worst case delay is selected for computation of the arrival time at the input of the next cell. Thus, illustration 111a shows a representation of a signal at "a" and a signal at "b" connected to separate inputs of a cell (between "a", "b" and "c"). The signal at "a" has an arrival time of 5 (see the value for "A" in the table linked to "a" in FIG. 1). The signal at "b" has an arrival time of 1 (see the value for "A" in the table linked to "b" in FIG. 1). The signals at "a" and "b" take different routes through the multi-input cell, these routes are referred to as arcs. As a result, at least as illustrated here, the signal at "a" and the signal at "b" are subject to different delays along their corresponding arcs, where the signal at "a" is subject to a delay of one and the signal at "b" is subject to a delay of two. Thus, the signal from "a", after traveling through its corresponding arc, can be represented as having an arrival time at "c" of 3. The signal from "b", after traveling through its corresponding arc, can be represented as having an arrival time at "c" of 6. The illustrated traditional process then selects the worst case values as the results. Here the worst case is illustrated at "c" is an arrival time of 6. Subsequently, the signal worst case arrival time is propagated along the interconnect having a delay of 2 between "c" and "d", to "d", through the arc of the second illustrated cell having a delay of 2 between "d" and "e", to "e", through the next interconnect having a delay of 1 between "e" and "f" to "f", through the arc of the third illustrated cell having a delay of 1 between "f" and "g", to "g", and so on until some point where the signal arrives at a terminus—e.g. a gated cell or other structure that is identified for analysis or selected based on one or more rules. Subsequently, the slack can be determined at "f", and required arrival times can be determined for each start/end point of an arc of the path. For instance, here the illustration provides that the slack at "f" is zero. Thus, the required arrival time and the actual arrival time are equal. Thus, working backwards from this point, the required arrival times can be computed where for illustration 111a which as shown for "f"-"a" are, in order, 11, 10, 8, 6, 4, and 5.

In contrast, illustration 111b provides a representative illustration of the deferred merger approach according to one embodiment. In particular, illustration 111b includes inputs to a multi-input cell being propagated with separate arrival times before being merged later when some condition(s) are met (e.g. a maximum number of stages or when the signals are within a similarity threshold). As illustrated, the signals at "a" and "b" are the same as those in 111a. Additionally, the delay of the arcs from "a" to "c" and from "b" to "c" are the same as those illustrated in 111a. However, unlike the illustration in 111a at "c" both the arrival times are separately maintained for propagation at "c" (see the immediate merger in illustration 111a lack of merger in 111b). Thus, at "c" the signal from "a" is represented by an arrival time of 6 and a as of yet, unknown required arrival time. Additionally, at "c" the signal from "b" is represented by an arrival time of 3 and an, as of yet, unknown required arrival time.

Subsequently, the signal at "c" from the "a" input is propagated through the interconnect from "c" to "d". However, while illustration 111a specified a delay of 2, illustrate 111b illustrates a delay of 1 or 2 depending on which signal is being propagated. For instance, if at "c" the signal from "a" is propagated then the delay used for this signal is 1. However, if at "c" the signal from "b" is propagated then the delay used for this signal is 2. This is different from the prior art approach illustrated in 111a because the prior art approach only includes the worst case results. That is a direct result of at least the merger of the signals at "c". Specifically, because the signals from "a" and "b" have been merged to their worst case results, the prior art approach cannot differentiate between the worst case for one signal from the worst case for another signal in a subsequent portion of a circuit.

The lack of an ability to differentiate is explained more thoroughly by way of example. If we deviate from the illustrate example a little and presume that the delay for the signal from "a" on the interconnect between "c" and "d" is 1 but the delay for the signal from "b" on the same interconnect is 5 then at "d" the signal from "a" would have an arrival time of 7 and the signal from "b" would have an arrival time of 8. Because we maintain both signals separately, the disclosed process can determine that the worst case arrival time at "d" would be 8. However, if we used the prior approach, only the results from one signal created from the signals from "a" and/or from "b" is maintained. As a result, the process cannot differentiate between delay for the signal from "a" or the signal from "b". As a result, for the same stage having the same delays of 1 or 5 depending on which input is propagated the prior approach must select the worst case delay (5) in determining arrival time at "d". Therefore, in our hypothetical deviation from the figure, the prior approach would determine that the worst case delay at "d" is 13.

In 111b we can see that 111b maintains separate delays for the signal from "a" and the signal from "b" on the interconnect between "c" and "d". Additionally, because we separately propagate the signals from "a" and from "b" between "c" and "d" we can use the corresponding delay for each signal. Thus, at "d" the signal from "a" has an arrival time of 7 (6+1) and the signal from "b" has an arrival time of 5 (3+2). Subsequently, each of the signals maintained at "d" are propagated through the cell from "d" to "e" where the signal from "a" has an arrival time of 8 (7+1) and the signal from "b" has an arrival time of 7 (5+2). Finally, at "e" the signals from "a" and "b" being separately propagated are merged to a single signal that can be represented as having an arrival time of 8 which is propagated from "e" to "f" where the arrival time is 9. Additionally, after making a determination of the slack at "f", the required arrival times can be computed by working backwards. For instance, as illustrated the required arrival times at "f"-"a" can be determined as previously discussed but for each of the propagates signals. For example, the signal from "a" might have a required arrival time of 10 at "e", 9 at "d", 8 at "c", and 7 at "a", and the signal from "b" might have a required arrival time of 10 at "e", 8 at "d", 6 at "c", and 4 at "b".

User station 110 includes or provides access to an electronic design system 150. For instance, the electronic design system 150 might be located on the user station 110, on a remote device access by the user station, or distributed across multiple devices. The user station 110 causes the execution of instructions of a deferred merge based method for graph based analysis that reduces pessimism over prior approaches as disclosed herein. The user station 110 comprises any type of computing station that is useable to operate or interface with the database 130. Examples of such user stations include workstations, personal computers, or remote computing terminals. The user station 110 comprises a display device, such as a display monitor, for displaying a user interface to users at the user station. The user station 110 also comprises one or more input devices for the user to provide operational control over the user station, such as a mouse or keyboard to manipulate a pointing object in a graphical user interface. In some embodiments, the graphical user interface includes tools for controlling and/or configuring the electronic design system such as configuring one or more rules used in determining how/when to merge or not merge signals and/or visualization tools for illustrating how one or more configuration settings are applied to a circuit to be analyzed, such as by highlighting or changing the color of paths that will be analyzed using the deferred merge process or that are subject to deferred merger based on the current settings or highlighting or changing the color of paths that meet the provided settings.

The electronic design system 150 as illustrated includes a circuit design tool 153 and a deferred merge timing analysis tool 155. In some embodiments, the various components, or their functions, of the electronic design system 150 are combined or separated into different components from those illustrated.

The circuit design tool 153, comprises a tool for creating and or modifying a circuit design. For instance, circuit design tools are generally know in the art and comprise different components for different types of design activities. For instance, one circuit design component might comprise an interface for accepting a hardware description or portion thereof as described by a hardware design language (e.g. Verilog, VHDL, etc.). Another circuit design component might comprise a circuit design component for manually manipulating/creating a circuit design using a circuit schematic. Yet another circuit design component might comprise a layout editor modifying layers of a design as they would be constructed on a semiconductor substrate. Generally, the circuit design tool 153 operates on design data (e.g. design data 131) and can be used to generate timing analysis data (e.g. timing analysis data 133) and delay/timing data (e.g. delay/timing data 135). In some embodiments, the circuit design tool 153 is modified to include an interface to control/access the deferred merge timing analysis tool 155.

The deferred merge timing analysis tool 155 operates on the design represented by design data 131 using timing analysis data 133 and the delay/timing data 135 to generate results data 137. This process will be discussed more fully in regard to subsequent figures. However, generally the process includes determining worst case timing information using graph based analysis where the identification of a multi-fan in cell triggers a determination as to whether to propagate multiple signals and calculate separate arrival times and possibly required arrival times while conditions indicated that propagation provides a benefit or meets one or more conditions (see e.g. illustration 111b).

The system includes a database 130 which is illustrated as including design data 131, timing analysis data 133, delay/timing data 135, and results data 137. In some embodiments, the database 130 comprises a single database with one or more subsets within that database for the design data 131, timing analysis data 133, delay/timing data 135, and results data 137 as illustrated in the figure. However, in some embodiments the database comprises multiple separate databases on different computing systems and/or in different locations connected via electronic communication links (e.g. wired and wireless networks). The system may further include database access modules for accessing and storing the data, whether stored at a single database or at multiple databases.

The design data 131 comprises any types of representations of a design. For instance, the design data comprises any one or more of a hardware descriptive language design, a circuit schematic design, a circuit layout, or any combination thereof. The design data 131 corresponds to at least part of the timing analysis data 133, delay/timing data 135, and results data 137. In some embodiments, the design data 131 includes multiple designs where the circuit design tool 153 and/or the deferred merge timing analysis tool 155 can select a design for analysis.

The timing analysis data 133 comprises any of static or statistical timing analysis data. For instance, both static and statistical timing analysis data comprises on-chip variation analysis. For example, on-chip variation (OCV) analysis results are generated using standard OCV analysis, advanced OCV, stage based OCV, location based OCV, Statistical OCV, statistical static timing analysis (SSTA) or any number of other techniques.

The delay/timing data 135 comprises sample data. The sample data corresponds to generated delay samples for respective segments associated with at least the arcs or interconnects of a design undergoing graph based analysis. In some embodiments, delay values are represented as static values for each arc or interconnect and signal combination. In some embodiments, the delay values represent a set of sample data that provides a statistical representation of the delay of the arc or interconnect.

The results data 137 includes at least arrival time results, and any other parameters relevant to timing such as required arrival time, slack, and a slack threshold(s).

Figure 2:
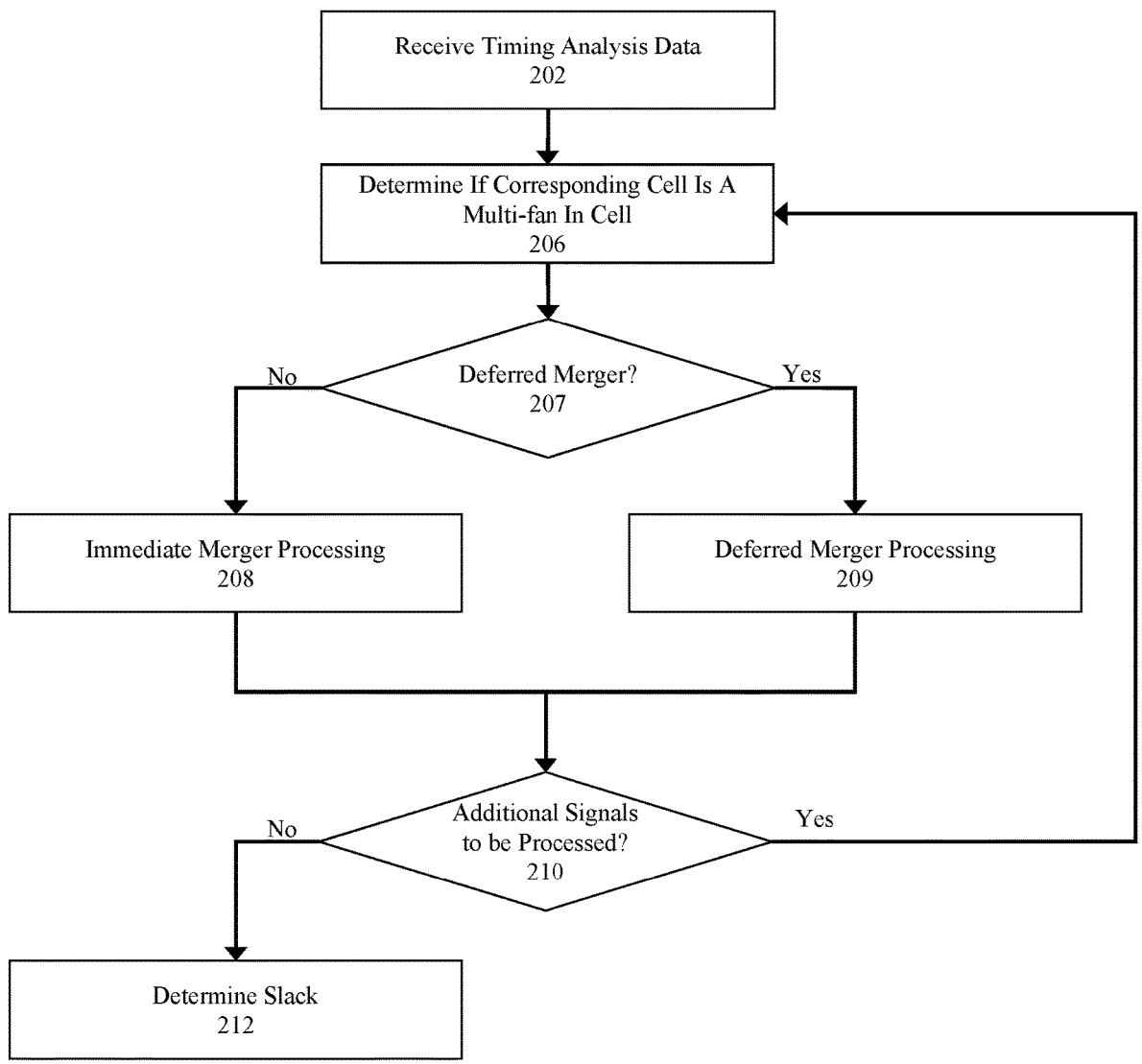
FIG. 2 illustrates a flow for a deferred merge approach to graph based analysis according to some embodiments.

FIG. 2 illustrates a flow for a deferred merge approach to graph based analysis according to some embodiments. Generally, the flow includes processing timing analysis data using one of two possible techniques. A first technique the merges signals from multi-fan in cells immediately and propagates only one signal (a worst case signal). A second technique defers the merger of signals from multi-fan in cells and propagates multi-fan in signals until conditions are met to perform a merger.

At 202 timing analysis data for graph based analysis is received. The timing analysis data (e.g. timing analysis data 133) comprises any type of static or statistical on-chip variation analysis. For instance, the timing analysis data might be tied to different nodes or edges of a graph that represent the arcs or interconnects of an electronic circuit. At 206, a particular cell or interconnect is identified for processing the timing analysis data 202 as represented by the graph. If the identified element is a cell, then the cell is analyzed to determine if the cell is a multi-fan in cell.

At 207, a determination is made as to whether to execute the deferred merger processing at 209 or whether to execute an immediate merger processing at 208. In some embodiments, if the cell is not a multi-fan in cell then the process proceeds to the immediate merger processing 208. In some embodiments, if the cell is a multi-fan in cell then an evaluation is performed to determine whether to execute the deferred merger processing. However, this and other embodiments, are discussed below in regard to FIG. 3.

The immediate merger processing 208 comprises the traditional worst case graph based analysis where multi-input cells output are merged immediately at their output and where only a single signal is propagated as part of the graph based analysis.

The deferred merger processing 209 implements a process that propagates multiple signals for timing analysis when/while some set of conditions are met. The deferred merger processing 209 will be discussed further regarding FIG. 4.

At 210, a determination is made as to whether there are additional signals to be processed. For instance, if another signal path has not yet been analyzed, that path is identified and the process returns to 206 where a determination is made as to whether a corresponding cell is a multi-fan in cell and the flow repeats based on the parameters associated with that signal.

At 212 a slack determination is made. For instance, slack might be determined at the output of each cell, at the input to each cell, at the input to any clock elements, or any combination thereof. Based on the determined slack modifications to the circuit design might be made to address timing issues, such as changing the composition of elements and interconnections, or changing the sizes or other characteristics of circuit elements.

Figure 3:
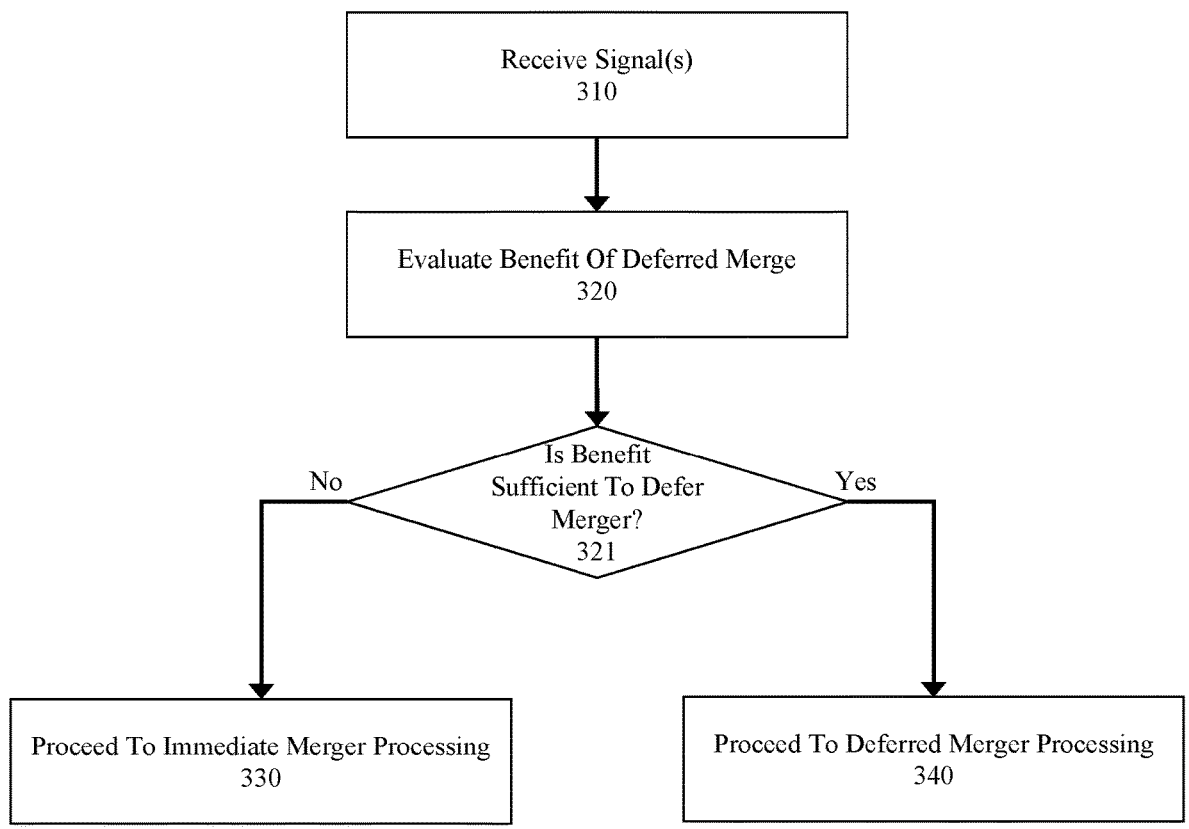
FIG. 3 illustrates a flow of an approach for the deferred merger determination illustrated in FIG. 2.

FIG. 3 illustrates a flow of an approach for the deferred merger determination illustrated in FIG. 2. Generally, the process makes an evaluation as to the benefit of implementing a deferred merger.

The process starts at 310 where a signal is received for evaluation. For instance, a signal might be tied to a cell or interconnection—e.g. one having multiple inputs, or only a single input.

At 320 an evaluation is made as to the benefit of deferring a merge. For instance, in one embodiment, a signal identified as part of only a single input to a cell is evaluated as having zero benefit from a deferred merger. In some embodiments, a determination is made prior to 320 to automatically route all single input signals to 330 where the signal is processed by proceeding to the immediate merger processing (see 208). In some embodiments, the signal corresponds to one of a plurality of multi-fan in inputs to a cell or interconnect. In some embodiments, signals that correspond to one or a plurality of multi-fan in inputs to a cell or interconnect are always evaluated to be associated with a benefit from deferring. In some embodiments, a benefit is determined by evaluating at least one of, the timing characteristics of the input signal of and/or the corresponding input signals, the delay of the arc or interconnect immediately proceeding the input signal or the corresponding input signals, the delay of subsequent arcs or interconnects. For instance, a benefit may be found when any of the arrival times, or delays for corresponding arcs/interconnects differ. In another example, a benefit may be found when one or more subsequent delays differ depending on which signal is propagated. In some embodiments, the benefit is identified based on the type of benefit (e.g. different arc/interconnect delays, different arrival times, etc.). In some embodiments, the benefit is determined based on a score, where the score is based on the differences between any of the factors considered—e.g. the timing characteristics of the input signal of and/or the corresponding input signals, the delay of the arc or interconnect immediately connected to the input signal or the corresponding input signals, the delay of subsequent arcs or interconnects for different signals. For instance, a difference between one or more pieces of signal timing information and between any subsequent delay might be used to generate a benefit score.

At 321 a determination is made as to whether the identified benefit is sufficient to defer merger. In some embodiments, the benefit is a score calculated in 320, and wherein a minimum score is required to proceed to the deferred merger processing at 340. In some embodiments, all multi-fan in signals are considered to be associated with sufficient benefit to defer merger. In some embodiments, one or more rules are used to identify benefits based on type where one or a combination of types of benefits are required as specified by the rules to find sufficient benefit (e.g. different arc/interconnect delays, different arrival times, etc.).

If at 312, there is not found to be sufficient benefit, then the process proceeds to an immediate merger processing step at 330 (see e.g. 208). If at 312, there is found to be sufficient benefit, then the process proceeds to the deferred merger processing step at 340 (see e.g. 209).

Figure 4:
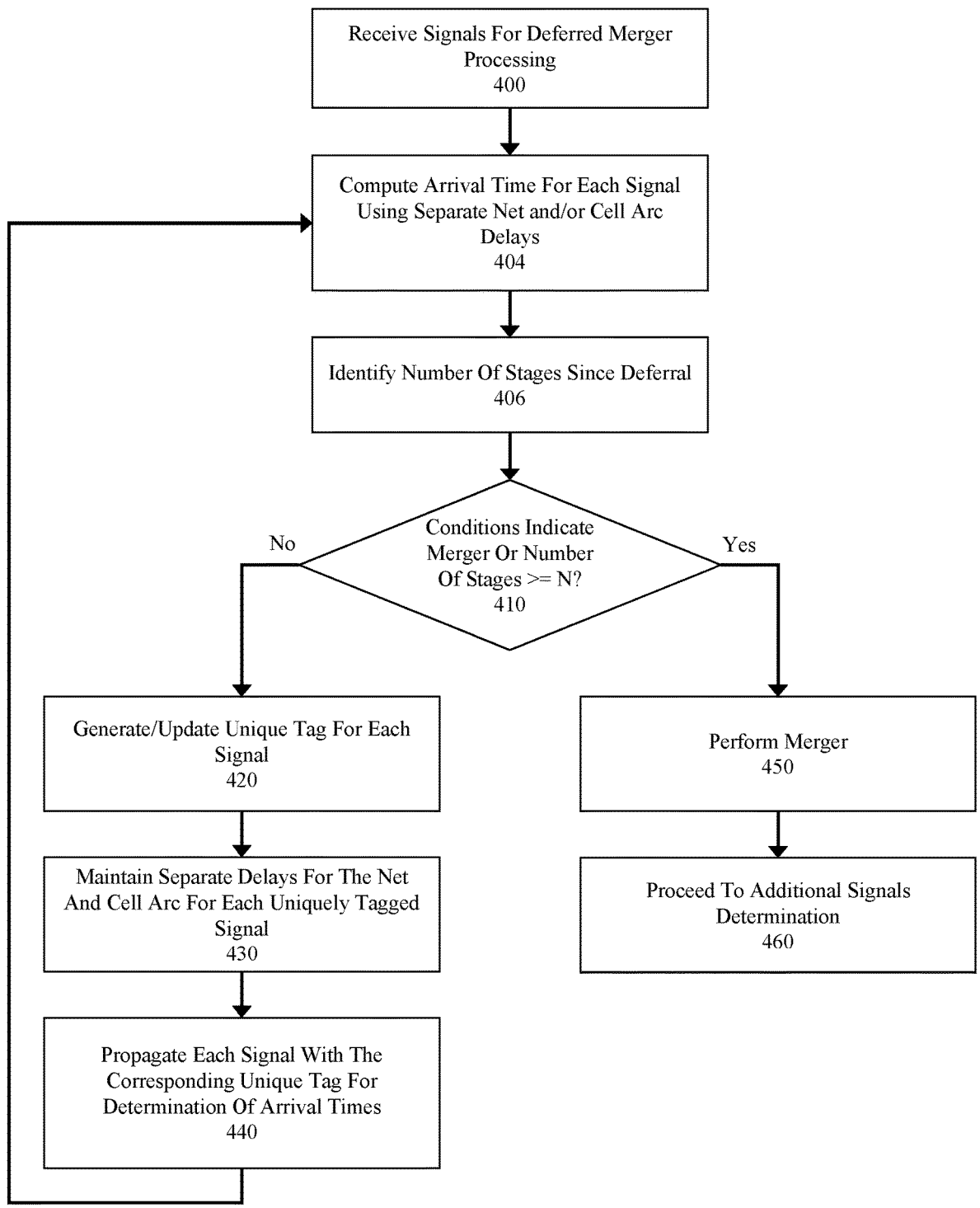
FIG. 4 illustrates a flow of an approach for the deferred merger processing illustrated in FIG. 2.

FIG. 4 illustrates a flow of an approach for the deferred merger processing illustrated in FIG. 2. Generally, the process includes computation of arrival time using multiple signals that are propagated from one or more multi-fan in cells/interconnects for some number of stages subject to one or more conditions being met.

At 400, one or more signals for deferred merger processing are received. For instance, the signal(s) might be received as a result of the deferred merger determination at 207. Subsequently, at 404 the arrival time for each signal is computed separately for any corresponding interconnect or cell arc. For example, the arrival time of the signal at an input to a cell is added to a delay corresponding to that cell arc and this process is repeated for each signal that is input to the cell.

At 406 a determination is made as to how many stages a signal has been deferred. For instance, a current deferral count can be determined by identifying the starting/origin point of the deferral and the current stage to be analyzed. A stage can be represented by any of an input to an output of a cell/interconnect, an output to an input to a cell/interconnect. In some embodiments, a number of stages deferred can be determined from a stage count that is associated with each signal. For example, each signal might be associated with one or more tags that identify an origin point of a signal associated with a deferred merger and that include a stage traversal count that is incremented or decremented each time the signal traverses a stage. In some embodiments, multiple concurrent deferrals might be occurring. For instance, if a first cell is a multi-fan in cell and a subsequent cell is also a multi-fan in cell an additional deferral might occur. In the event that two or more deferrals are overlapping (being maintained at the same input/output of a cell/interconnect), the approach can managed this process using a table, list, other data structure, or one or more tags associated with the deferred signals that identifies where a deferral first occurred and/or a deferral count for each deferral. In some embodiments, each deferral is also associated with data representing where the deferral occurred.

At 410 a determination is made as to whether conditions have been met that indicate that a merger should occur. For instance, in one embodiment, signals are deferred until a deferral stage count reaches or exceeds a threshold (e.g. N). In some embodiments, a determination is made as to whether a benefit is sufficient to continue to defer merger. For instance, a benefit could be identified similar to the way discussed above in regard to FIG. 3 box 320 and a determination could be made similar to that discussed in regard to FIG. 3 box 321. In some embodiments, additional or different evaluations could be performed. For example, a lower threshold could be used to determine whether the benefit is sufficient, because at least part of the initial cost (e.g. in resource usage for storage) of deferral has already been expended. In some embodiments, the determination could be adaptive, wherein a merger is more likely when multiple multi-fan in deferrals are currently being propagated along a single signal path. In some embodiments, signals are deferred only until they reach and/or exceed a specified number of stages. In some embodiments, signals are only merged at the output of a cell even if the number of stages is met or exceeded or conditions otherwise indicate merger. In some embodiments, a determination might be based on a need to perform a slack calculation at a give point in a design. For instance, at a buffered output cell a slack determination might be necessary.

At 450 a merger is performed as a result of a determination at 410 to perform a merger. Generally, the merger here is the same as a traditional immediate merger. However, instead of operating on signals that are immediately merged, they operate on signals that have been deferred at least once. Additionally, in some embodiments, multiple levels of deferral might be occurring. If there are multiple levels of deferral occurring the process might merge one set of signals from one multi-fan in cell but not another set from another multi-fan in cell. Thus, while not illustrated the merger at 450 might subsequently proceed to 420. However, if the merger merges all signal that are currently subject to deferred merger then at 460 the process continues at 210 as discussed above. In some embodiments, one or more data structures or identifiers (e.g. tags) are updated/removed as part of the merger process of 450.

If at 410 a determination is made not to merge two or more signals, then in some embodiments, the process proceeds to 420 where a unique tag is generated or updated for each signal. For example, in some embodiments a unique tag is generated for each signal that is deferred that identifies the signals origin point (e.g. at the input to a multi-fan in cell). In some embodiments, the unique tag also identifies a stage count. For instance, a deferred signal might be identified by a tag comprising a cell identifier (for the origin cell) and an input number/name to that cell. Additionally, each time the signal is propagated through a stage, a counter value passed along the signal with or as part of a tag or other identifier or database could be incremented to update the corresponding information. In some embodiments, multiple tags may be associated with one or more inputs. For example, a first tag might be associated with a first multi-fan in cell along a path, and a second tag associated with a subsequent point along the same path that is associate with another multi-fan in cell.

At 430, separate delays for the net and cell arcs are maintained that are associated with each uniquely tagged signal. For instance, each arc and interconnect might be associated with different delay values (whether statistical or static) depending on which input a signal is being propagated. At 440 each signal with a corresponding unique tag is propagated for determination of arrival times. For instance, each uniquely identified signal might be propagated to 404, where depending on the information associated with the signal, arrival times are calculated based on the separate delays maintained in step 430. In some embodiments, each or some of the separately maintained signals are associated with a required arrival time. For instance, after computation of arrival times, and slack at a given point, required arrival times are calculated backwards. Additionally, these required arrival time and calculated arrival times might be maintained in a storage structure (e.g. temporary memory structure or database) for use in performing other calculations associated with one or more signals of paths that might also use the signal (e.g. at a downstream branch).

Embodiments of the process discussed herein is further illustrated below by the examples provided in FIGS. 5A-7G.

Figure 5A:
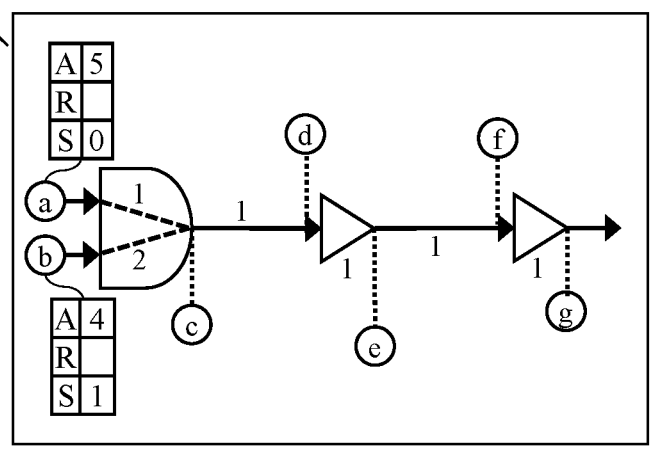
FIGS. 5A-5B provides an illustrative example an approach for deferred merger processing.
Figure 5B:
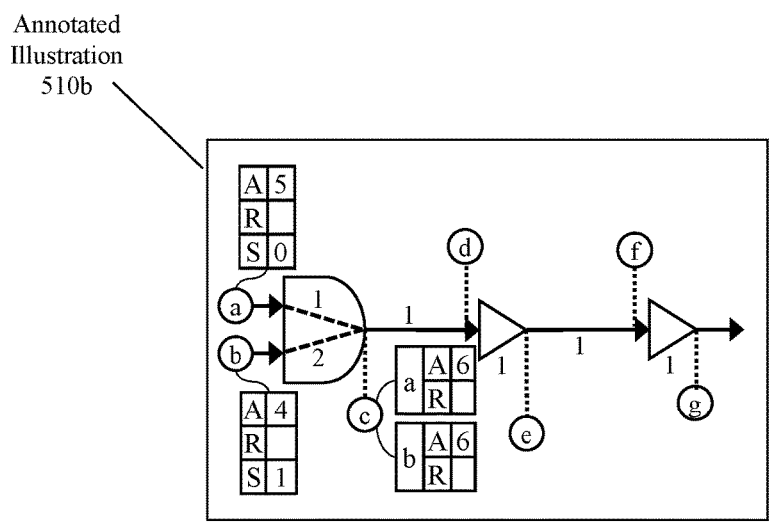

FIGS. 5A-5B provides an illustrative example an approach for deferred merger processing. Here, FIGS. 5A-5B illustrate a determination that a deferred merge should not occur despite a corresponding multi-fan in cell.

FIG. 5A includes an annotated illustration similar illustration 111b. For instance, the annotated illustration 510a includes a first cell having inputs at "a" and "b" and an output connected to an interconnect at "c". The first cell (between "a", "b", and "c") has two different arcs having two different delays corresponding to each input. For instance, the delay for the input at "a" propagating through the first cell to "c" is 1, and the delay for the input at "b" propagating through the first cell to "c" is 2. Additionally, the delays for signals propagating between "c" and "d", "d" and "e", "e" and "f", and "f" and "G" are all 1.

As illustrated in FIG. 5A, the signal at "a" has an arrival time of 5, an as of yet unknown required arrival time, and a slack at the input to the first cell of zero. Also as illustrated in FIG. 5A, the signal from "b" has an arrival time of 4, an as of yet unknown required arrival time, and a slack at the input to the first cell of one.

FIG. 5B illustrates the propagation of the signals at "a" and "b" to "c" where both the signals from "a" and "b" are represented (see annotated illustration 510b). In some embodiments, we identify the signals using the identifiers at 520b. For instance, the first cell could be identified as Ph1, the input at "a" could be identified as "input1", and the input at "b" could be identified as "input2". Thus, the signal at "a" after propagating through ph1 could be identified as "Ph1 (Tag: input1:1): Arr: 6, R:", and the signal from "b" after propagating through ph1 could be identified as "Ph1 (Tag: input2:1): Arr: 6, R:". Note that "Arr" is the calculated arrival time based on the arrival time to the input of the cell plus the delay, and that "R" is the required arrival time which is currently unknown. Additionally, the ":1" in "input1:1" and in "input2:1" is representative of a stage count for the propagated signals from "a" and "b". However, in some embodiments, the tags are not generated for the different possible outputs of the first multi-fan in cell until a determination is made to defer merger of those signals.

Here, as can be seen from at least the figure, both of the signals from "a" and "b" have the same arrival time at "c". Furthermore, the delay for each subsequent stage ("c" to "d", "d" to "e", "e" to "f", "f" to "g") are all equal to 1. Thus, here the process might determine that conditions are met for a merge because the signal from "a" and "b" are equal at "c", or because the subsequent stages have the same delay regardless of which signal is propagated, or some combination thereof. Thus, the merged signal can be represented by the identifier at 540 as "Ph1: Arr 6, R:". In some embodiments, the process will eventually populate the required arrival time values as previously discussed by back propagating using the slack and other timing information and performing one or more computations. For example, the require arrival time at "a" might equal 5, at "b" might equal 4. Additionally, the at "c" for the signal from "a" and "b" might equal 6.

FIGS. 6A-6D provides an illustrative example an approach for deferred merger processing. Here, FIGS. 6A-6D illustrate a determination that a deferred merge should occur at a multi-fan in cell, but where a merger occurs before a specified stage count is reached.

Figure 6A:
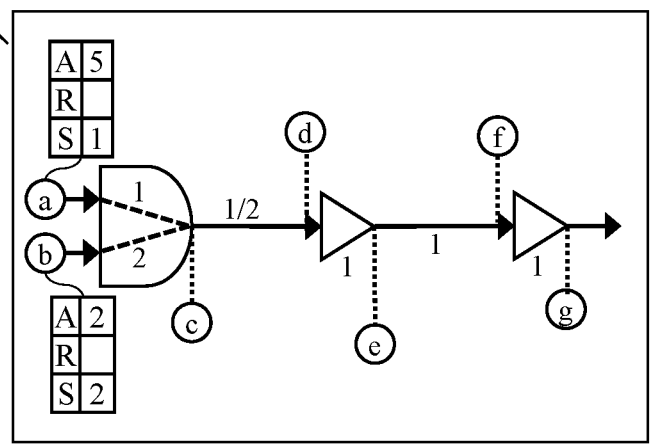
FIGS. 6A-6D provides an illustrative example an approach for deferred merger processing.

FIG. 6A includes an annotated illustration 610a that is largely similar to illustration 510a FIG. 5A. Specifically, FIG. 6A includes a first cell having inputs at "a" and "b" and an output connected to an interconnect at "c". The first cell (between "a", "b", and "c") has two different arcs having two different delays corresponding to each input. For instance, the delay for the input at "a" propagating through the first cell to "c" is 1, and the delay for the input at "b" propagating through the first cell to "c" is 2. Additionally, the delays for signals propagating between "c" and "d" is either 1 or 2 depending on which signal is being propagated and the delays between "d" and "e", "e" and "f", and "f" and "G" are all 1.

As illustrated, the signal at "a" has an arrival time at the input of the first cell of 5, a currently unknown required arrival, and slack at the input to the cell of 1. Additionally, as illustrated, the signal from "b" has an arrival time at the input of the first cell of 2, a currently unknown required arrival time, and slack at the input to the cell of 2.

Figure 6B:
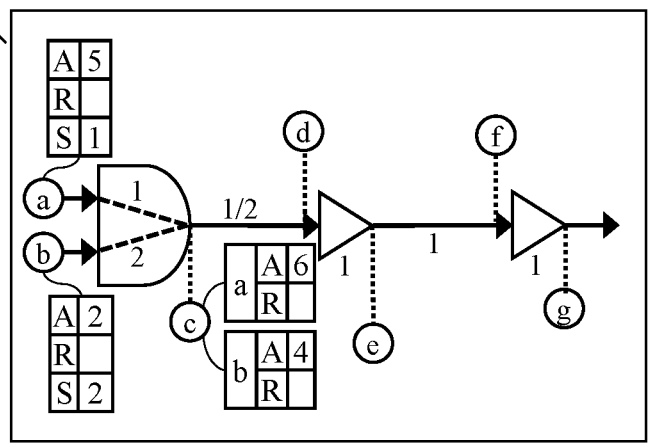

FIG. 6B illustrates the propagation and a representation of the signals from "a" and "b" after they have propagated to "c" (see annotated illustration 610b). Here the signal from "a" propagates through the first input of the first cell over an arc having a delay of 1. Additionally, the signal from "b" propagates through the second input of the second cell over an arc having a delay of 2. Thus, at "c" the signals from "a" and "b" can be identified by the identifiers at 620b, where the signal from "a" is identified by "Ph1 (Tag: input1:1): Arr: 6, R:" and the signal from "b" is identified by "Ph1 (Tag: input2:1): Arr: 4, R:".

However, whereas the illustration of FIGS. 5A-5B show the signals from "a" and "b" having equal calculated arrival times, FIG. 6B illustrates the signals from "a" and "b" having different calculated arrival times (6 vs 4). Thus, the signals from "a" and "b" are not equal though they might be considered equal given a large enough threshold. In some embodiments, different calculated arrival times might result in deferred merger processing (e.g. as determined at 207). In some embodiments, different calculate arrival times might not be sufficient to result in deferred merger processing. Instead, different calculated arrival times and/or different delay on a downstream part of the circuit for the different inputs might be required. For instance, the interconnect between "c" and "d" has a delay of 1 for the signal from "a" on input1 of the first cell and a delay of 2 for the signal from "b" on the input2 of the first cell.

Figure 6C:
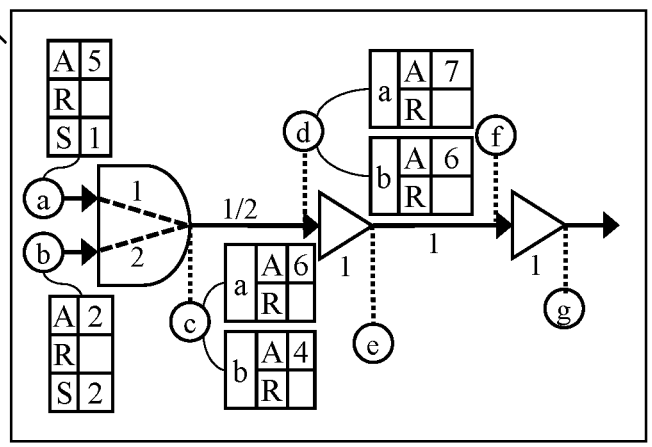

FIG. 6C illustrates the propagation and a representation of signals from "a" and "b" over the interconnect between "c" and "d" (see annotated illustration 610c). Here, the signal from "a" is subject to a delay of 1 and the signal from "b" is subject to a delay of 2. Thus, the calculated arrival time at "d" for the signal from "a" comprises 7 and the required arrival time is currently unknown. Additionally, the calculated arrival time at "d" for the signal from "b" comprises 6 and the required arrival time is currently unknown. In some embodiments, a difference in calculated arrival times of one or more is a sufficient condition to cause the initiation of a merger of signals subject to deferred merger. However, in some embodiments, additional or different information is required to determine that signal mergers should no longer be deferred. In some embodiments, conditions for a merger are otherwise met by this illustration, except that mergers are only executed at the output of a cell, and not at the end of an interconnect. Here, for the sake of this example we presume that the conditions for merger are not met.

At "d" the signals from "a" and "b" can be identified by the identifiers at 620c, where the signal from "a" is identified by "Ph1 (Tag: input1:2): Arr: 7, R:" and the signal from "b" is identified by "Ph1 (Tag: input2:2): Arr: 6, R:". Note that here, "input1:1" and "input2:1" have been replaced by "input1:2" and "input2:2" where ":2" represents the signal having been propagated through two stages.

Figure 6D:
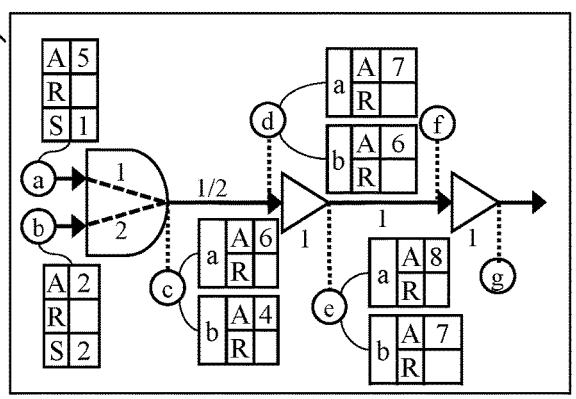
Figure 6D:

FIG. 6D illustrates the propagation and a representation of the signals from "a" and "b" propagating over the interconnect between "d" and "e" and the merger of those signals (see annotated illustration 610d). Here, both the signal from "a" and the signal from "b" are subject to a delay of 1. Thus, the calculated arrival time at "e" for the signal from "a" comprises 8 and the required arrival time is currently unknown. Additionally, the calculated arrival time at "e" for the signal from "b" comprises 7 and the required arrival time is currently unknown. As discussed above, in some embodiments, a difference in calculated arrival time of one or more is sufficient to initiate a merger of the deferred merge signals. However, in some embodiments, additional or different information is required to determine that signal mergers should no longer be deferred. In some embodiments, conditions for a merger are otherwise met by this illustration. However, the illustration here does not include and downstream cells or interconnects that have different delays for the signal from "a" or the signal from "b". Thus, here the illustration provides an example where the signals from "a" and "b" are merged at "e".

In some embodiments, at "e" the signals from "a" and "b" can be identified by the identifiers at 620d, where the signal from "a" is identified by "Ph1 (Tag: input1:3): Arr: 8, R:" and the signal from "b" is identified by "Ph1 (Tag: input2:3): Arr: 7, R:". Note that here, "input1:2" and "input2:2" have been replaced by "input1:3" and "input2:3" where ":3" represents the signal having been propagated through three stages. Finally, After the merger, the merged signal can be represented by "Ph1: Arr: 8, R:". In some embodiments, the process will eventually populate the required arrival time values as previously discussed by back propagating using the slack and other timing information and performing one or more computations. For example, the require arrival time: at "a" might equal 6, at "b" might equal 4. Additionally, for the signal from "a" the required arrival time might be 7 at "c", 8 at "d", and 9 at "e". Finally, for the signal from "b" the required arrival time might be 6 at "c", 8 at "d", and 9 at "e".

FIGS. 7A-7G provides an illustrative example an approach for deferred merger processing. Here, FIGS. 6A-6D illustrate a determination that a deferred merge should occur at a multi-fan in cell where a merger occurs after a stage count is reached.

Figure 7A:
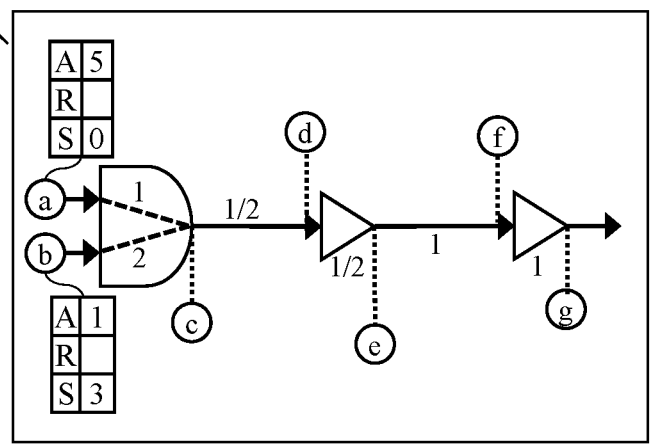
FIGS. 7A-7G provides an illustrative example an approach for deferred merger processing.

FIG. 7A includes an annotated illustration 710a that is largely similar to illustration 610a FIG. 6A. Specifically, FIG. 7A includes a first cell having inputs at "a" and "b" and an output connected to an interconnect at "c". The first cell (between "a", "b", and "c") has two different arcs having two different delays corresponding to each input. For instance, the delay for the input at "a" propagating through the first cell to "c" is 1, and the delay for the input at "b" propagating through the first cell to "c" is 2. Additionally, the delays for signals propagating between "c" and "d" and between "d" and "e" is either 1 or 2 depending on which signal is being propagated and the delays between "e" and "f", and "f" and "G" are 1.

As illustrated, the signal at "a" has an arrival time at the input of the first cell of 5, a required arrival time that is currently unknown, and slack at the input to the cell of zero. Additionally, as illustrated, the signal from "b" has an arrival time at the input of the first cell of 1, a required arrival time that is currently unknown, and slack at the input to the cell of 3.

Figure 7B:
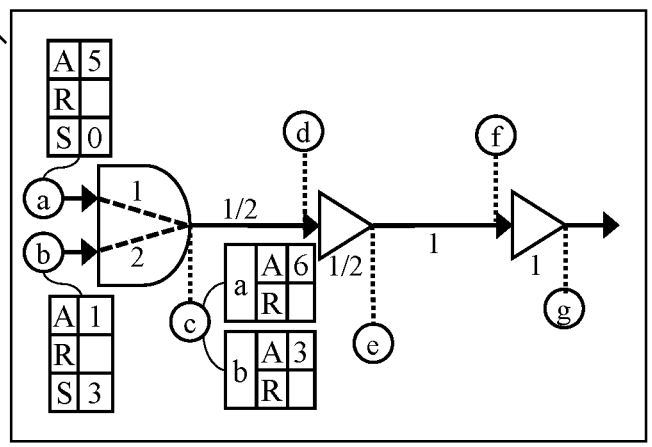

FIG. 7B illustrates the propagation and a representation of the signals from "a" and "b" after they have propagated to "c" (see annotated illustration 710b). Here, the signal from "a" propagates through the first input of the first cell over an arc having a delay of 1. Additionally, the signal from "b" propagates through the second input of the second cell over an arc having a delay of 2. Thus, at "c" the signals from "a" and "b" can be identified by the identifiers at 720b, where the signal from "a" is identified by "Ph1 (Tag: input1:1): Arr: 6, R:" and the signal from "b" is identified by "Ph1 (Tag: input2:1): Arr: 3, R:". Thus, the signals from "a" and "b"

have different calculated arrival times. While in some embodiments, multiple different criteria as embodied in one or more rules could be used to determining when to merger, defer, or continue to defer, in this example we presume the only condition that might be met is the stage count condition. Here, the stage count is 1 and therefore, the signals are not merged.

Figure 7C:
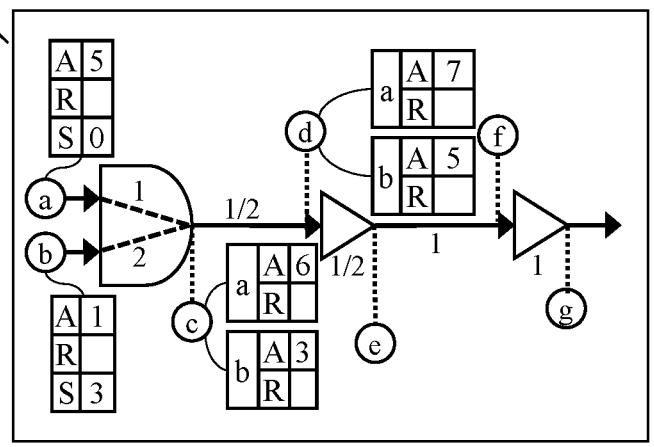

FIG. 7C illustrates the propagation and a representation of the signals from "a" and "b" after they have propagated to "d" over the interconnect between "c" and "d" (see annotated illustration 710c). Here, the signal from "a" is again subject to a delay of 1 and the signal from "b" is again subject to a delay of 2. Thus, the calculated arrival time at "d" for the signal from "a" comprises 7 and the required arrival time at "d" for the signal from "a" is currently unknown. Additionally, the calculated arrival time at "d" for the signal from "b" comprises 5 and the required arrival time at "d" for the signal from "b" is currently unknown. Here, we assume that the current stage count is again less than the specified stage count. Thus, the signals will not yet be merged.

At "d" the signals from "a" and "b" can be identified by the identifiers at 720c, where the signal from "a" is identified by "Ph1 (Tag: input1:2): Arr: 7, R:" and the signal from "b" is identified by "Ph1 (Tag: input2:2): Arr: 5, R:". Note that here, "input1:1" and "input2:1" have been replaced by "input1:2" and "input2:2" where ":2" represents the signal having been propagated through two stages.

Figure 7D:
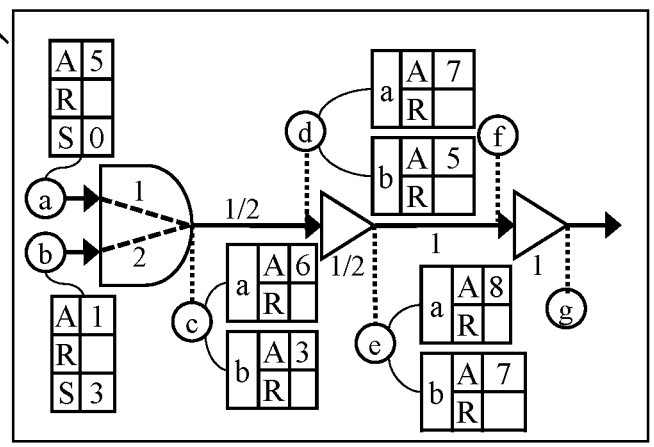

FIG. 7D illustrates the propagation and a representation of the signals from "a" and "b" propagating to "e" through the arc between "d" and "e" (see annotated illustration 710d). Here, the signal from "a" is subject to a delay of 1 and the signal from "b" is subject to a delay of 2. Thus, the calculated arrival time at "e" for the signal from "a" comprises 8 and the required arrival time at "e" for signal from "a" is currently unknown. Additionally, the calculated arrival time at "e" for the signal from "b" comprises 7 and the required arrival time at "e" for the signal from "b" is currently unknown. Here, we again assume that the current stage count is again less than the specified stage count. Thus, the signals will not yet be merged.

At "e" the signal from "a" and "b" can be identified by the identifiers at 720d, where the signal from "a" is identified by "Ph1 (Tag: input1:3): Arr: 8, R:" and the signal from "b" is identified by "Ph1 (Tag: input2:3): Arr: 7, R:". Note that here, "input1:2" and "input2:2" have been replaced by "input1:3" and "input2:3" where ":3" represents the signal having been propagated through three stages.

Figure 7E:
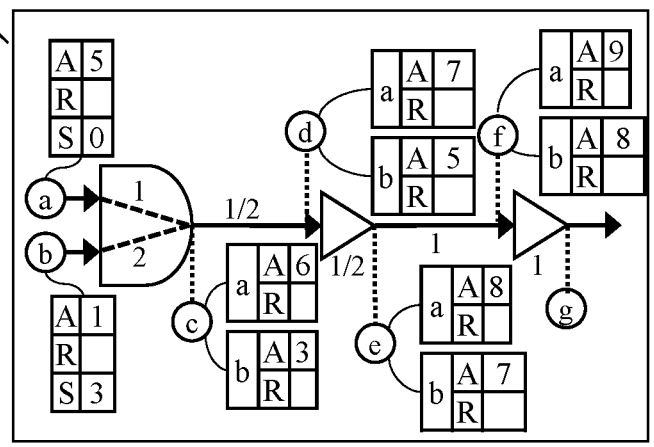

FIG. 7E illustrates the propagation and a representation of the signals from "a" and "b" propagating to "f" through the interconnect between "e" and "f" (see annotated illustration 710e). Here, both of the signals from "a" and "b" are subject to a delay of 1. Thus, the calculated arrival time at "f" for the signal from "a" comprises 9 and the required arrival time at "f" for signal from "a" is currently unknown. Additionally, the calculated arrival time at "f" for the signal from "b" comprises 8 and the required arrival time at "f" for the signal from "b" is currently unknown. Here, we assume that the stage count condition is met. However, for illustration purposes we also assume that merges only occur at the output of a cell. Here "f" is the end of an interconnect and the input of a cell. Thus, in this example with the specified rule, the merger must be delayed until the signals reach "g".

At "f" the signal "a" and "b" can be identified by the identifiers at 720e, where the signal from "a" is identified by "Ph1 (Tag: input1:4): Arr: 9, R:" and the signal from "b" is identified by "Ph1 (Tag: input2:4): Arr: 8, R:". Note that here, "input1:3" and "input2:3" have been replaced by "input1:4" and "input2:4" where ":4" represents the signal having been propagated through four stages.

Figure 7F:
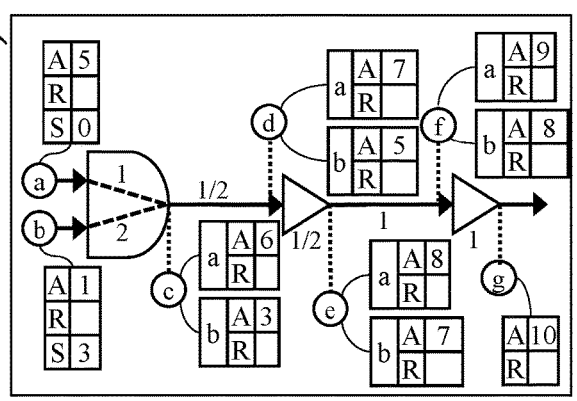

FIG. 7F illustrates the propagation and merger of the signals from "a" and "b" propagating to "g" through the cell between "f" and "g" (see annotated illustration 710f). Here, both of the signals from "a" and "b" are again subject to a delay of 1. Thus, the calculated arrival time at "f" for the signal from "a" comprises 9 and the required arrival time at "f" for signal from "a" is currently unknown. Additionally, the calculated arrival time at "f" for the signal from "b" comprises 8 and the required arrival time at "f" for the signal from "b" is currently unknown. Here, we assume that the stage count condition is met and that a merger is allowed because "g" is the output of a cell. Thus, in this example the merger should now occur.

At "g" the signal "a" and "b" can be identified by the identifiers at 720f, where the signal from "a" is identified by "Ph1 (Tag: input1:5): Arr: 10, R:" and the signal from "b" is identified by "Ph1 (Tag: input2:5): Arr: 9, R:". Note that here, "input1:4" and "input2:4" have been replaced by "input1:5" and "input2:5" where ":5" represents the signal having been propagated through five stages. Thus, the merged signal at "g" can be represented by "Ph1: Arr: 10, R:".

Figure 7G:
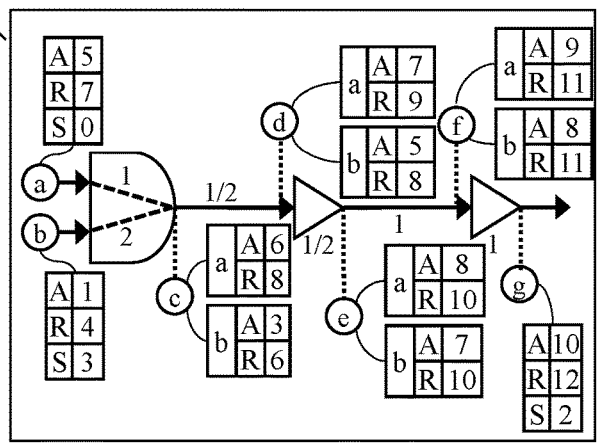

FIG. 7G illustrates the determination of slack and the back propagation of timing information to determine required arrival times.

For example, is "g" is located at the terminus of a path (e.g. a clocked gate or cell) then we might determine a slack according to some embodiments. For instance, here the slack is illustrated as being equal to 2 at "g". Using this slack value we can then determiner the required arrival time at "g" which as illustrated is equal to 12. Subsequently, the required arrival times for the propagated signals can be determined at locations "f" through "a" working backwards. To illustrate, for the signal from "a" the required arrival time might be 11 at "f", 10 at "e", 9 at "d", 8 at "c", and 7 at "a". Finally, for the signal from "b" the required arrival time might be 11 at "f", 10 at "e", 8 at "d", 6 at "c", and 4 at "a".

System Architecture Overview

Figure 8:
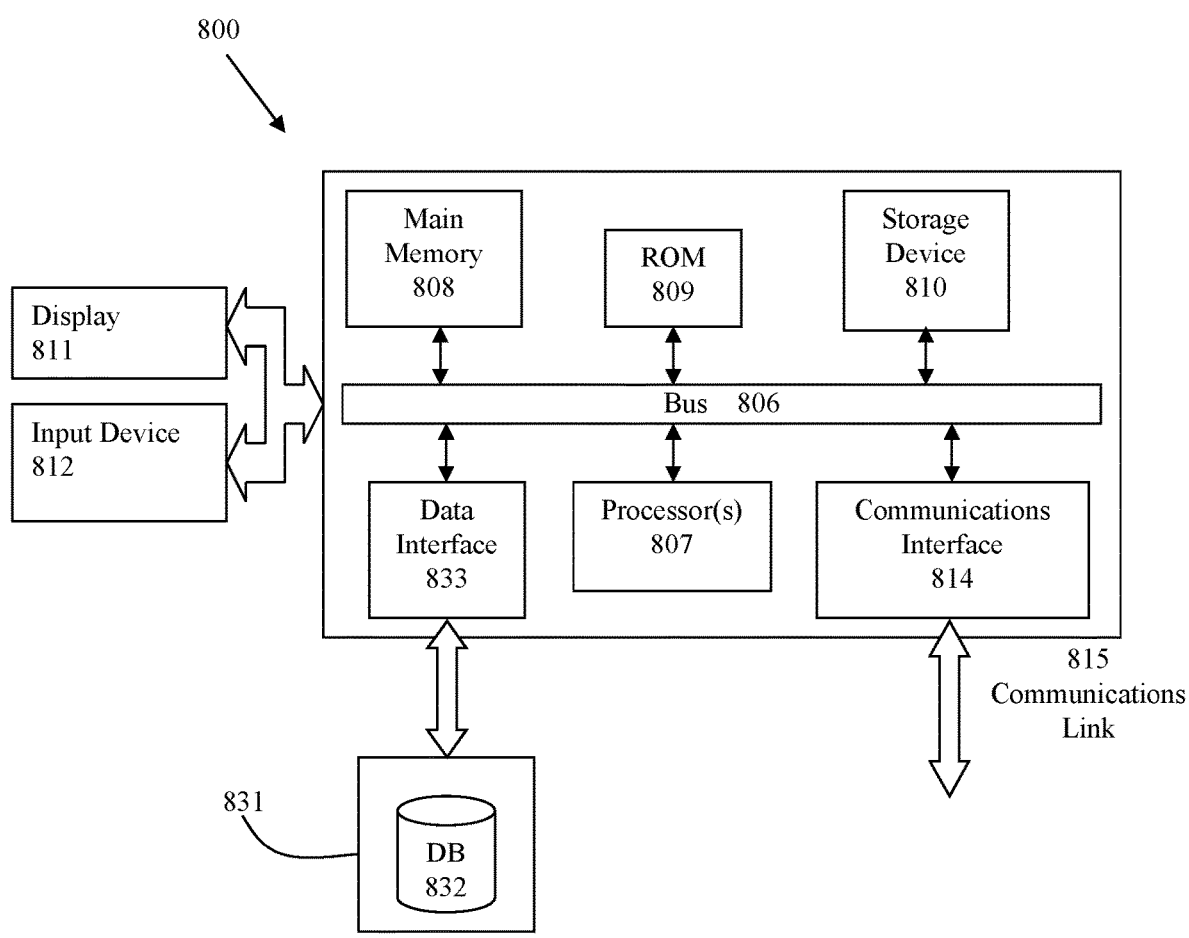
FIG. 8 shows an architecture of an example computing system with which the invention may be implemented.

FIG. 8 shows an architecture of an example computing system with which the invention may be implemented. Computer system 800 includes a bus 806 or other communication mechanism for communicating information, which interconnects subsystems and devices, such as processor 807, system memory 808 (e.g., RAM), static storage device 809 (e.g., ROM), disk drive 810 (e.g., magnetic or optical), communication interface 814 (e.g., modem or Ethernet card), display 811 (e.g., CRT or LCD), input device 812 (e.g., keyboard), and cursor control.

According to one embodiment of the invention, computer system 800 performs specific operations by processor 807 executing one or more sequences of one or more instructions contained in system memory 808. Such instructions may be read into system memory 808 from another computer readable/usable medium, such as static storage device 809 or disk drive 810. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 807 for execution. Such a medium may take many forms, including but not limited to, non-volatile media and volatile media. Non-volatile media includes, for example, optical or magnetic disks, such as disk drive 810. Volatile media includes dynamic memory, such as system memory 808.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 800. According to other embodiments of the invention, two or more computer systems 800 coupled by communication link 815 (e.g., LAN, PTSN, or wireless network) may perform the sequence of instructions required to practice the invention in coordination with one another.

Computer system 800 may transmit and receive messages, data, and instructions, including program, i.e., application code, through communication link 815 and communication interface 814. Received program code may be executed by processor 807 as it is received, and/or stored in disk drive 810, or other non-volatile storage for later execution. Computer system 800 may communicate through a data interface 833 to a database 832 on an external storage device 831.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method, comprising:
   receiving timing analysis data for a design to be analyzed to determine worst case timing;
   identifying a multi-fan-in cell corresponding to the timing analysis data;
   propagating signals from the multi-fan-in cell to an output of the multi-fan-in cell by at least calculating arrival times corresponding to two or more inputs of the multi-fan-in cell using corresponding delays;
   determining whether a condition has been met to merge the signals propagated from the multi-fan-in cell; and
   deferring merger of the signals propagated from the multi-fan-in cell when the condition has not been met.

2. The method of claim 1, further comprising merging at least two of the signals propagated from the multi-fan-in cell to a single signal.

3. The method of claim 1, wherein the condition is based at least in part on a number of signals being propagated.

4. The method of claim 1, wherein the condition comprises at least a comparison between a number of stages a corresponding signal has been propagated.

5. The method of claim 1, wherein the condition comprises at least a determination that a difference between two or more of the signals propagated from the multi-fan-in cell is within a threshold.

6. The method of claim 1, where the condition comprises at least a determination that one or more delays for one or more subsequent stages have a difference that is within a threshold.

7. The method of claim 1, wherein separate delays for cell arcs and interconnects are maintained for the signals propagated from the multi-fan-in cell while merger of the signals propagated from the multi-fan-in cell is deferred.

8. The method of claim 1, where the signals propagated from the multi-fan-in cell are uniquely identified.

9. A non-transitory computer readable medium having stored thereon a sequence of instructions which, when executed by a processor performs a set of acts, the set of acts comprising:
   identifying a multi-fan-in cell corresponding to timing analysis data for a design to be analyzed to determine worst case timing;
   calculating arrival times corresponding to two or more inputs of the multi-fan-in cell using corresponding delays and corresponding signals; and
   determining whether a condition has been met to merge the arrival times corresponding to the two or more inputs of the multi-fan-in cell; and
   deferring merger of the arrival times corresponding to the two or more inputs of the multi-fan-in cell when the condition has not been met.

10. The computer readable medium of claim 9, the set of acts further comprising merging at least two of the signals propagated from the multi-fan-in cell to a single signal.

11. The computer readable medium of claim 9, wherein the condition is based at least in part on a number of signals being propagated.

12. The computer readable medium of claim 9, wherein the condition comprises at least a comparison between a number of stages a corresponding signal has been propagated.

13. The computer readable medium of claim 9, wherein the condition comprises at least a determination that a difference between two or more of the signals propagated from the multi-fan-in cell is within a threshold.

14. The computer readable medium of claim 9, where the condition comprises at least a determination that one or more delays for one or more subsequent stages have a difference that is within a threshold.

15. The computer readable medium of claim 9, wherein separate delays for cell arcs and interconnects are maintained for the signals propagated from the multi-fan-in cell while merger of the signals propagated from the multi-fan-in cell is deferred.

16. The computer readable medium of claim 9, where the signals propagated from the multi-fan-in cell are uniquely identified.

17. A system, comprising:
   a timing analysis tool for performing worst case timing analysis on a design by executing a set of acts, the set of acts comprising:
      propagating signals from a multi-fan-in cell to an output of the multi-fan-in cell by at least calculating arrival times corresponding to two or more inputs of the multi-fan-in cell using corresponding delays; and
      determining whether a condition has been met to merge the arrival times corresponding to the two or more inputs of the multi-fan-in cell; and
      deferring merger of the arrival times corresponding to the two or more inputs of the multi-fan-in cell when the condition has not been met.

18. The system of claim 17, the set of acts further comprising merging at least two of the signals propagated from the multi-fan-in cell to a single signal.

19. The system of claim 17, wherein the condition is based at least in part on a number of signals being propagated.

20. The system of claim 17, wherein the condition comprises at least a comparison between a number of stages a corresponding signal has been propagated.

* * * * *